(12) United States Patent
Li

(10) Patent No.: US 10,409,151 B2
(45) Date of Patent: Sep. 10, 2019

(54) PORTABLE AIR PROJECTION APPARATUS

(71) Applicants: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

(72) Inventor: Shufu Li, Hangzhou (CN)

(73) Assignees: ZHEJIANG GEELY HOLDING GROUP CO., LTD, Hangzhou (CN); ZHEJINANG GEELEY AUTOMOBILE RESEARCH NSTITUTE CO., LTD, Taizhou (CN)

( * ) Notice: Subject to any disclaimer, the term of this patent is extended or adjusted under 35 U.S.C. 154(b) by 0 days.

(21) Appl. No.: 15/737,819

(22) PCT Filed: Jun. 12, 2016

(86) PCT No.: PCT/CN2016/085458
§ 371 (c)(1),
(2) Date: Dec. 19, 2017

(87) PCT Pub. No.: WO2016/202218
PCT Pub. Date: Dec. 22, 2016

(65) Prior Publication Data
US 2019/0004412 A1 Jan. 3, 2019

(30) Foreign Application Priority Data
Jun. 19, 2015 (CN) .......................... 2015 1 0350260

(51) Int. Cl.
G03B 21/608 (2014.01)
G03B 29/00 (2006.01)
(Continued)

(52) U.S. Cl.
CPC ............ *G03B 21/608* (2013.01); *G03B 21/62* (2013.01); *G03B 29/00* (2013.01); *H04N 5/74* (2013.01);
(Continued)

(58) Field of Classification Search
CPC ...................................................... G03B 21/56
(Continued)

(56) References Cited

U.S. PATENT DOCUMENTS 5,067,653 A 11/1991 Araki et al.
5,658,063 A 8/1997 Nasserbakht
(Continued)

FOREIGN PATENT DOCUMENTS

BR MU8700434 U 11/2008
CN 2864745 Y 1/2007
(Continued)

OTHER PUBLICATIONS

International Search Report and Written Opinion of International Search Authority for International Patent Application No. PCT/CN2016/085458 dated Aug. 24, 2016, with English translation of Search Report, 10 pages.

*Primary Examiner* — Clayton E. LaBalle
*Assistant Examiner* — Kevin C Butler
(74) *Attorney, Agent, or Firm* — Alston & Bird LLP

(57) ABSTRACT

Provided is a portable air projection apparatus, which may be used in conjunction with a mobile phone and can project the content displayed on the screen of the mobile phone in the air. The apparatus may be carried with one and used instantly. The portable air projection apparatus comprises: a vapor projection curtain generation device, which can generate a gaseous curtain wall through a vapor outlet; a communication interface, which can be connected with a portable mobile communication device via a signal; a signal (Continued)

transceiving and processing unit for receiving a display signal from the portable mobile communication device through the communication interface, and converting the display signal into a projection control signal; and a projection lens for generating a projection display screen on the gaseous curtain wall according to the projection control signal.

17 Claims, 3 Drawing Sheets

(51) Int. Cl.
    *H04N 5/74* (2006.01)
    *G03B 21/62* (2014.01)
    *G03B 21/56* (2006.01)
    *G03B 21/58* (2014.01)
    *G03B 21/625* (2014.01)
    *G03B 21/60* (2014.01)

(52) U.S. Cl.
    CPC .............. *G03B 21/56* (2013.01); *G03B 21/58* (2013.01); *G03B 21/60* (2013.01); *G03B 21/625* (2013.01)

(58) Field of Classification Search
    USPC ........................................................ 359/443
    See application file for complete search history.

(56) References Cited

U.S. PATENT DOCUMENTS

| | | | |
|---|---|---|---|
| 2004/0080820 A1* | 4/2004 | Palovuori | G03B 21/608 359/443 |
| 2009/0033637 A1* | 2/2009 | Han | G06F 3/0421 345/175 |
| 2015/0092266 A1 | 4/2015 | Yeremian | |
| 2016/0328082 A1* | 11/2016 | Argiro | G06F 3/0416 |

FOREIGN PATENT DOCUMENTS

| | | | | |
|---|---|---|---|---|
| CN | 101533322 A | 9/2009 | | |
| CN | 201331752 Y | 10/2009 | | |
| CN | 102707558 A | 10/2012 | | |
| CN | 202794829 U | 3/2013 | | |
| CN | 103365489 A | 10/2013 | | |
| CN | 203313303 U | 11/2013 | | |
| CN | 103901709 | * 7/2014 | ........... G03B 21/608 | |
| CN | 103901709 A | 7/2014 | | |
| CN | 203761488 | * 8/2014 | ............ G03B 21/56 | |
| CN | 203761488 U | 8/2014 | | |
| CN | 104460215 A | 3/2015 | | |
| CN | 204402087 U | 6/2015 | | |
| CN | 104977794 A | 10/2015 | | |
| CN | 204807905 U | 11/2015 | | |
| JP | H-0283438 A | 3/1990 | | |
| JP | 2015179131 A | 10/2015 | | |
| KR | 20070101883 A | 10/2007 | | |
| KR | 20110090231 A | 8/2011 | | |

* cited by examiner

PORTABLE AIR PROJECTION APPARATUS

CROSS-REFERENCE TO RELATED APPLICATIONS

The present application is a national phase entry of International Application No. PCT/CN2016/085458, filed Jun. 12, 2016, which claims priority to Chinese Patent Application No. 201510350260.6, filed Jun. 19, 2015, which are incorporated herein by reference in their entirety.

FIELD OF THE INVENTION

The invention relates to projection technologies, and in particular, to a portable air projection apparatus.

BACKGROUND OF THE INVENTION

In business or entertainment activities, people often need to demonstrate some electronic materials, for example, presentation files, videos, websites, etc., to or share same with other persons Usually, people carry computers with them, and connect the computers with video peripherals. These peripherals generally comprise projectors, televisions, etc., wherein the price of a projector is relatively high, the space needed is relatively large, and it requires a white wall or a projection curtain, which brings difficulties to the popularity of projection. Although the popularity of television is wide, because of its too big weight and the need for a power supply, people cannot carry televisions with themselves, and thereby cannot share their own electronic information with others whenever necessary.

With the development of the times, computers are also gradually replaced by mobile phones, and connections of mobile phones with projectors and televisions are also realized. Although a mobile phone may replace part of the functions of a computer and may be carried with one conveniently, the above problem also exists, that is, a projector and a television cannot be carried with one, or in some special situations, for example, in a vehicle such as a car, a train, etc., it will be very difficult when it is necessary to realize projection of the screen of a mobile phone.

However, many business opportunities just exist in a short-time chat in a vehicle such as a car, a train, etc., or in an accidental meeting chat in an airport waiting hall. In such situations, if it involves demonstrating or sharing electronic materials on hand, there is not yet provided a projection device which is portable and can make an instant display.

SUMMARY OF THE INVENTION

An object of the invention is to provide a portable air projection apparatus, which may be used in conjunction with a mobile phone and can project the content displayed on the screen of the mobile phone in the air. The apparatus may be carried with one and used instantly.

To achieve the above object, the invention provides a portable air projection apparatus comprising:

a vapor projection curtain generation device which can generate a gaseous curtain wall through a vapor outlet;

a communication interface which can be connected with a portable mobile communication device via a signal;

a signal transceiving and processing unit for receiving a display signal from the portable mobile communication device through the communication interface, and converting the display signal into a projection control signal; and a projection lens for generating a projection display screen on the gaseous curtain wall according to the projection control signal.

Preferably, in the above-described apparatus, the vapor outlet is of a long strip shape, and both ends of the long strip shape have adjusting plates which adjust the angle of vapor ejection, thereby adjusting the side range of the gaseous curtain wall.

Preferably, in the above-described apparatus, there is further comprised:

a system control unit for controlling the height of the gaseous curtain wall by adjusting the flow quantity and flow rate of the vapor.

Preferably, in the above-described apparatus, the system control unit is further used for adjusting the projection angle and the focal length of the projection lens according to the side range of the gaseous curtain wall and the height of the gaseous curtain wall, so as to control the range of the projection display screen.

Preferably, in the above-described apparatus, there is further comprised:

an infrared detector located behind the gaseous curtain wall and used for detecting an action of a human finger on the projection display screen, generating a touch control signal, and sending the touch control signal to the portable mobile communication device via the communication interface.

Preferably, in the above-described apparatus, there is further comprised:

a finger cot in which are arranged a gravity sensor and a signal transmitting device for generating the touch control signal for the projection display screen.

Preferably, in the above-described apparatus, there is further comprised: a built-in battery for charging the portable mobile communication device, wherein the portable mobile communication device is a mobile phone or a tablet computer.

Preferably, in the above-described apparatus, the vapor outlet is a fan-shaped structure protruding from a housing; and inside the fan-shaped structure are arranged a plurality of air ducts in a radial arrangement, and each of the air ducts has a flow rate control valve, which causes the gaseous curtain wall to be a rectangular structure through flow rate control.

Preferably, in the above-described apparatus, a water storage tank of the vapor projection curtain generation device has a water suction hose, which can suck water from an external water container directly.

Preferably, in the above-described apparatus, the vapor projection curtain generation device further has a pigment addition module for adding a pigment to the liquid that produces vapor.

The embodiments of the invention have the following technical effects.

1) The embodiments of the invention conduct projection of a mobile phone screen through a gaseous curtain wall, do not need a projector, do not need a tangible screen or wall, do not need a television or a computer either, may conduct presentation or sharing of an electronic material carried with one anytime and anywhere, and are very suitable for a situation where a short-time chat is conducted in a vehicle such as a car, a train, etc., which can conduct a very effective instant communication and can effectively promote the development of business activities.

2) By the adjusting plates tilting to both sides, the embodiments of the invention increase the angle of vapor ejection to both sides, and in turn increase the area of the air projection screen.

3) The embodiments of the invention adjust the size of the gaseous curtain wall by adjusting the flow quantity and the flow rate of vapor, and adjust the imaging effect of a projected image by regulating the angle and the focal length of the projection lens.

4) By the vapor outlet of a fan-shaped structure protruding from the housing, the embodiments of the invention may realize a large screen with a small size, increasing the portability of the product.

5) In the embodiments of the invention, by arranging a water suction hose, it is convenient to get water, the volume of the water storage tank is reduced, and the portability of the product is increased.

According to the detailed description of specific embodiments of the invention in conjunction with the drawings in the following, the above and other objects, advantages and features of the invention will be clearer to those skilled in the art.

BRIEF DESCRIPTION OF THE DRAWINGS

In the following, some specific embodiments of the invention will be described in detail with reference to the drawings in an exemplary and non-limiting manner. In the drawings, identical reference signs denote identical or similar components or parts. It will be appreciated by those skilled in the art that these drawings are not necessarily drawn to scale. In the drawings.

DETAILED DESCRIPTION OF THE INVENTION

Figure 1:
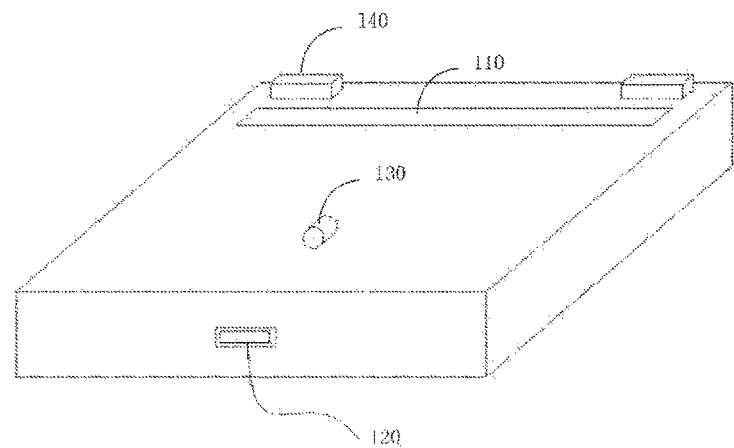
FIG. 1 is a stereo structure diagram of a portable air projection apparatus of an embodiment of the invention.
Figure 2:
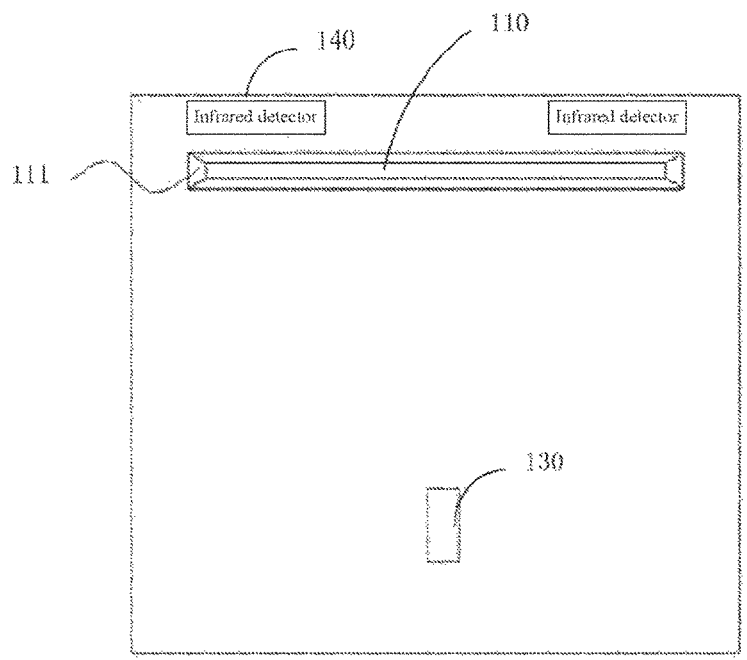
FIG. 2 is a top view of a portable air projection apparatus of an embodiment of the invention.

FIG. 1 and FIG. 2 are a stereo structure diagram and a top view of a portable air projection apparatus of an embodiment of the invention. As shown in FIG. 1 and FIG. 2, an embodiment of the invention provides a portable air projection apparatus comprising:

a vapor projection curtain generation device which can generate a gaseous curtain wall through a vapor outlet 110;

a communication interface 120 which can be connected with a portable mobile communication device via a signal;

a signal transceiving and processing unit for receiving a display signal from the portable mobile communication device through the communication interface, and converting the display signal into a projection control signal; and a projection lens 130 for generating a projection display screen on the gaseous curtain wall according to the projection control signal.

It can be seen that in the embodiment of the invention, the communication interface receives a signal from a mobile phone, and after the signal is processed, an optical image is emitted by the projection lens and projected on the gaseous curtain wall generated by the vapor outlet. Since the gaseous curtain wall is almost invisible to the naked eye, the information of the screen of the mobile phone is displayed in the air like a screen.

Therefore, the embodiment of the invention conducts projection of a mobile phone screen through a gaseous curtain wall, does not need a projector, does not need a tangible screen or wall, does not need a television or a computer either, may conduct presentation or sharing of an electronic material carried with one anytime and anywhere, and is very suitable for a situation where a short-time chat is conducted in a vehicle such as a car, a train, etc., which can conduct a very effective instant communication and can effectively promote the development of business activities.

As shown in FIG. 2, the vapor outlet is of a long strip shape, and both ends of the long strip shape have adjusting plates 111 which adjust the angle of vapor ejection, thereby adjusting the side range of the gaseous curtain wall. By tilting the adjusting plates 111 to both sides, the angle of vapor ejection to both sides will be increased, and in turn the area of the air projection screen will be increased.

Figure 3:
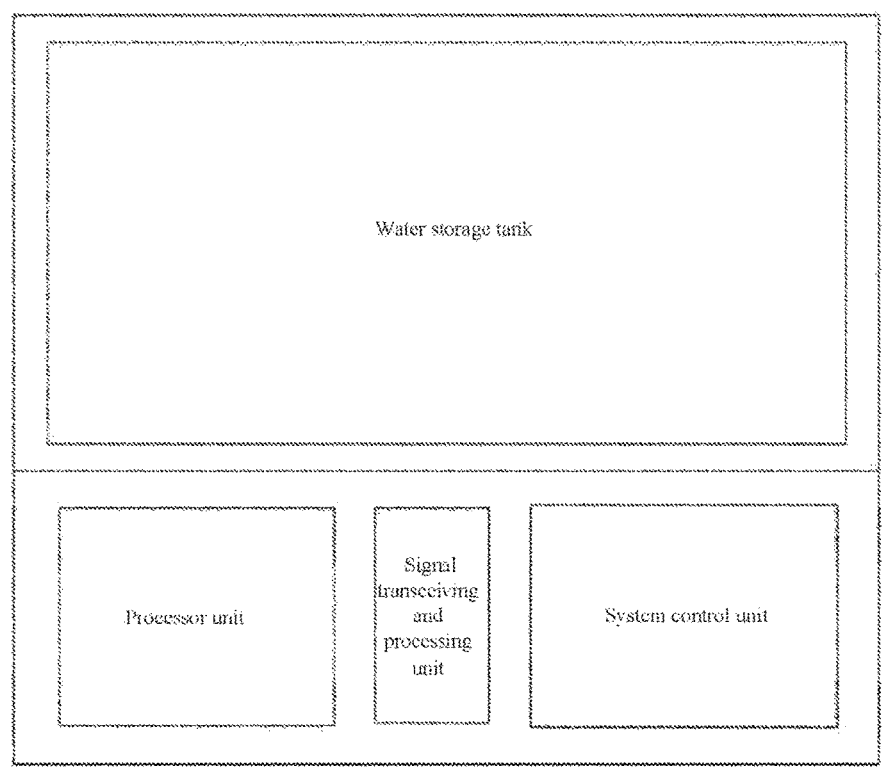
FIG. 3 is an internal structure diagram of a portable air projection apparatus of an embodiment of the invention.

FIG. 3 is an internal structure diagram of a portable air projection apparatus of an embodiment of the invention. As shown in FIG. 3, inside the portable air projection apparatus, besides the signal transceiving and processing unit and a processor unit, there is further comprised:

a system control unit for controlling the height of the gaseous curtain wall by adjusting the flow quantity and flow rate of the vapor. When there is a need for a large screen, the flow quantity and the flow rate are increased, to cause the range of the vapor flow to expand, and thereby cause the area of the gaseous curtain wall to be enlarged.

The system control unit is further used for adjusting the projection angle and the focal length of the projection lens according to the side range of the gaseous curtain wall and the height of the gaseous curtain wall, so as to control the range of the projection display screen. This may make the projection display screen match the effective range of the gaseous curtain wall as much as possible, and prevent vapor waste. For example, if the gaseous curtain wall is very large, and yet the projection display screen is very small, it is necessary to enlarge the projection display screen through the projection angle and the focal length, or reduce the gaseous curtain wall by decreasing the flow rate of vapor.

As shown in FIG. 1 and FIG. 2, the portable air projection apparatus further comprises:

an infrared detector 140 located behind the gaseous curtain wall and used for detecting an action of a human finger on the projection display screen, generating a touch control signal, and sending the touch control signal to the portable mobile communication device via the communication interface.

In the figures, the number of the infrared detectors 140 is two, and of course, it may also be larger. The infrared detectors are arranged behind the screen, and thus an error of detection data and in turn a mistaken operation will not be caused due to human hand's occlusion.

Further, there may further be an external finger cot in which are arranged a gravity sensor and a signal transmitting device for generating the touch control signal for the projection display screen.

Figure 4:
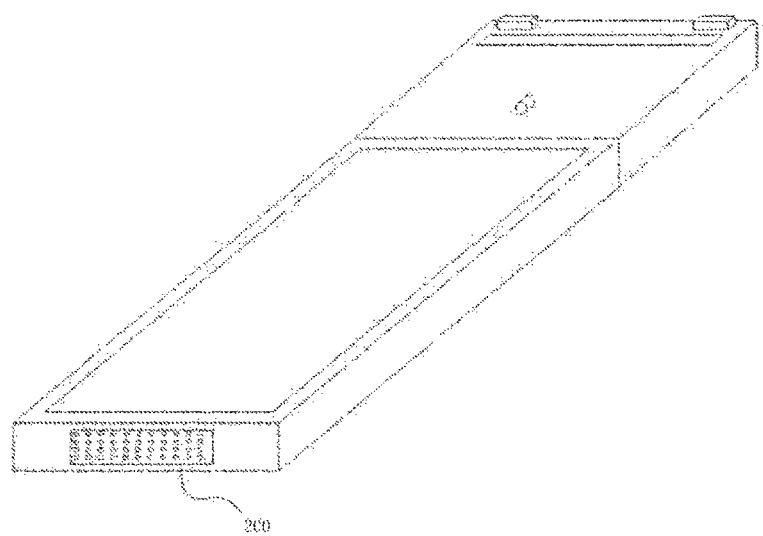
FIG. 4 is a diagram of the use of a portable air projection apparatus of an embodiment of the invention in conjunction with a mobile phone.

FIG. 4 is a diagram of the use of a portable air projection apparatus of an embodiment of the invention in conjunction with a mobile phone. As shown in FIG. 4, the casing of the portable air projection apparatus may be designed to match that of a mobile phone, and they are connected directly at the communication interface, and become a unified entity after the connection. The portable air projection apparatus produces a projection image, and conducts sound playback through a speaker 200 of the mobile phone.

In an embodiment of the invention, the portable air projection apparatus has a built-in battery for charging the portable mobile communication device. Therefore, when the portable air projection apparatus is not used as a projector, it may act as a power bank, such that users are more willing to carry it with them. The portable mobile communication device is a mobile phone or a tablet computer.

In the apparatus, the communication interface is not limited to a USB interface, but may be a blue-tooth or other wireless interface.

Figure 5:
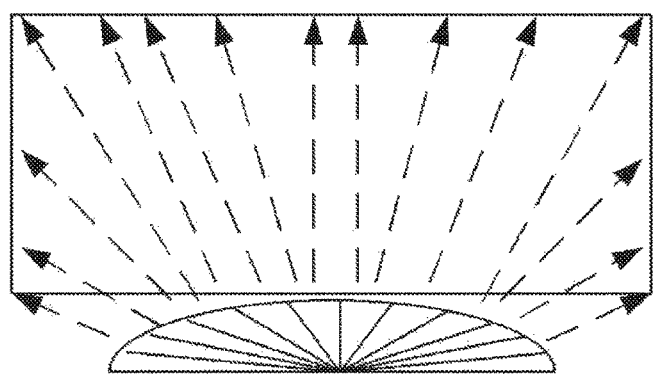
FIG. 5 is a structure diagram of a vapor outlet of a portable air projection apparatus of an embodiment of the invention.

FIG. 5 is a structure diagram of a vapor outlet of a portable air projection apparatus of an embodiment of the invention. As shown in FIG. 5, the vapor outlet is a fan-shaped structure protruding from a housing; and inside the fan-shaped structure are arranged a plurality of air ducts in a radial arrangement, and each of the air ducts has a flow rate control valve, which causes the gaseous curtain wall to be a rectangular structure through flow rate control.

In this embodiment, the vapor outlet is arranged to be a fan-shaped structure protruding from the housing, and it may send out vapor in a fan-shaped radial pattern, thereby implementing a large curtain wall with a small air outlet, which is beneficial to the miniaturization of the air outlet and is conducive to portability. This is because if it is simply a planar straight air outlet, its air outgoing angle is limited, and it is difficult to implement a large screen far exceeding the width of the air outlet.

The fan-shaped structure protruding from the housing may be foldable or retractable, and is folded or retracted when not in use, which keeps the appearance smooth.

In addition, as shown in FIG. 5, since the screen projection is generally rectangular, if the gaseous curtain wall is radiated to be fan-shaped, it will cause vapor waste, and therefore the gaseous curtain wall is made to be substantially rectangular as a whole by controlling each air duct, which may save vapor.

In a further embodiment of the invention, a water storage tank of the vapor projection curtain generation device has a water suction hose, which can suck water from an external water container directly. This is because in view of miniaturization and portability, the water storage tank must not be too large, it is troublesome to frequently add water and therefore a water suction hose is arranged directly, and an on-site disposable drinking cup or even a mineral water bottle is utilized as a temporary water storage tank, which not only solves the source of water, but also reduces the volume of the portable air projection apparatus.

In a further embodiment of the invention, the vapor projection curtain generation device further has a pigment addition module for adding a pigment to the liquid that produces vapor. This is because when the light is not good, the display effect of the transparent vapor curtain wall will not be ideal, and the addition of a pigment will cause the light transmittance of the curtain wall to decrease and make it similar to a real wall, which may improve the projection effect of the curtain wall.

Further, in a further embodiment of the invention, there may be arranged two vapor outlets, the former ejects a transparent gaseous curtain wall, and the latter ejects a gaseous curtain wall to which an edible pigment is added to act as a base, which may thus further achieve a simple stereo effect.

From the above, the invention has the following advantages:

1) The embodiments of the invention conduct projection of a mobile phone screen through a gaseous curtain wall, do not need a projector, do not need a tangible screen or wall, do not need a television or a computer either, may conduct presentation or sharing of an electronic material carried with one anytime and anywhere, and are very suitable for a situation where a short-time chat is conducted in a vehicle such as a car, a train, etc., which can conduct a very effective instant communication and can effectively promote the development of business activities.

2) By the adjusting plates tilting to both sides, the embodiments of the invention increase the angle of vapor ejection to both sides, and in turn increase the area of the air projection screen.

3) The embodiments of the invention adjust the size of the gaseous curtain wall by adjusting the flow quantity and the flow rate of vapor, and adjust the imaging effect of a projected image by regulating the angle and the focal length of the projection lens.

4) By the vapor outlet of a fan-shaped structure protruding from the housing, the embodiments of the invention may realize a large screen with a small size, increasing the portability of the product.

5) In the embodiments of the invention, by arranging a water suction hose, it is convenient to get water, the volume of the water storage tank is reduced, and the portability of the product is increased.

So far, those skilled in the art will appreciate that although multiple exemplary embodiments of the invention have been shown and described in detail herein, many other variations or modifications consistent with the principles of the invention may still be determined directly or deduced according to the content disclosed in the invention, without departing from the spirit and the scope of the invention. Therefore, the scope of the invention shall be understood and deemed to encompass all these other variations or modifications.

The invention claimed is:

1. A portable air projection apparatus, comprising:
   a vapor projection curtain generation device configured to generate a gaseous curtain wall through a vapor outlet;
   a communication interface configured to be connected with a portable mobile communication device via a signal;
   a signal transceiving and processing unit configured to receive a display signal from the portable mobile communication device through the communication interface and convert the display signal into a projection control signal;
   a projection lens configured to generate a projection display screen on the gaseous curtain wall according to the projection control signal;
   an infrared detector located behind the gaseous curtain wall and configured to detect an action of a human finger on the projection display screen, generate a touch control signal, and send the touch control signal to the portable mobile communication device via the communication interface; and
   a finger cot in which are arranged a gravity sensor and a signal transmitting device configured to generate the touch control signal for the projection display screen.

2. The portable air projection apparatus of claim 1, wherein the vapor outlet is of a long strip shape, and both ends of the long strip shape have adjusting plates which adjust an angle of vapor ejection, thereby adjusting a side range of the gaseous curtain wall.

3. The portable air projection apparatus of claim 2, further comprising:
a system control unit configured to control a height of the gaseous curtain wall by adjusting a flow quantity and a flow rate of a vapor.

4. The portable air projection apparatus of claim 3, wherein the system control unit is configured to adjust the projection angle and a focal length of the projection lens according to the side range of the gaseous curtain wall and the height of the gaseous curtain wall, so as to control the range of the projection display screen.

5. The portable air projection apparatus of claim 1, further comprising:
a built-in battery for charging the portable mobile communication device, wherein the portable mobile communication device is a mobile phone or a tablet computer.

6. The portable air projection apparatus of claim 1,
wherein the vapor outlet is a fan-shaped structure protruding from a housing;
wherein a plurality of air ducts are arranged in a radial arrangement inside the fan-shaped structure; and
wherein each of the air ducts has a flow rate control valve configured to cause the gaseous curtain wall to be a rectangular structure through control of the flow rate.

7. The portable air projection apparatus of claim 1, wherein the vapor projection curtain generation device comprises a water storage tank and a water suction hose, the water suction hose configured to draw water directly from an external water container.

8. The portable air projection apparatus of claim 1, wherein the vapor projection curtain generation device comprising a water storage tank and a pigment addition module for adding a pigment to a liquid that produces a vapor.

9. A portable air projection apparatus comprising:
a vapor projection curtain generation device configured to generate a gaseous curtain wall through a vapor outlet, the vapor projection curtain generation device comprising a water storage tank and a pigment addition module for adding a pigment to a liquid that produces a vapor;
a communication interface which can be connected with a portable mobile communication device via a signal;
a signal transceiving and processing unit for receiving a display signal from the portable mobile communication device through the communication interface, and converting the display signal into a projection control signal; and
a projection lens for generating a projection display screen on the gaseous curtain wall according to the projection control signal.

10. The portable air projection apparatus of claim 9, wherein the vapor outlet is of a long strip shape, and both ends of the long strip shape have adjusting plates which adjust an angle of vapor ejection, thereby adjusting a side range of the gaseous curtain wall.

11. The portable air projection apparatus of claim 9, further comprising:
a system control unit configured to control a height of the gaseous curtain wall by adjusting a flow quantity and a flow rate of a vapor.

12. The portable air projection apparatus of claim 11, wherein the system control unit is configured to adjust the projection angle and a focal length of the projection lens according to the side range of the gaseous curtain wall and the height of the gaseous curtain wall, so as to control the range of the projection display screen.

13. The portable air projection apparatus of claim 9, further comprising:
an infrared detector located behind the gaseous curtain wall and configured to detect an action of a human finger on the projection display screen, generate a touch control signal, and send the touch control signal to the portable mobile communication device via the communication interface.

14. The portable air projection apparatus of claim 13, further comprising:
a finger cot in which are arranged a gravity sensor and a signal transmitting device configured to generate the touch control signal for the projection display screen.

15. The portable air projection apparatus of claim 9, further comprising:
a built-in battery for charging the portable mobile communication device, wherein the portable mobile communication device is a mobile phone or a tablet computer.

16. The portable air projection apparatus of claim 9, wherein
the vapor outlet is a fan-shaped structure protruding from a housing;
a plurality of air ducts are arranged in a radial arrangement inside the fan-shaped structure; and
each of the air ducts has a flow rate control valve configured to cause the gaseous curtain wall to be a rectangular structure through control of the flow rate.

17. The portable air projection apparatus of claim 9, wherein the vapor projection curtain generation device comprises a water storage tank and a water suction hose, the water suction hose configured to draw water directly from an external water container.

* * * * *

UNITED STATES PATENT AND TRADEMARK OFFICE
CERTIFICATE OF CORRECTION

PATENT NO. : 10,409,151 B2
APPLICATION NO. : 15/737819
DATED : September 10, 2019
INVENTOR(S) : Li Page 1 of 1

It is certified that error appears in the above-identified patent and that said Letters Patent is hereby corrected as shown below:

On the Title Page

Item (73) Assignees: The name of the second assignee, "ZHEJINANG GEELEY AUTOMOBILE RESEARCH NSTITUTE CO., LTD" should read --ZHEJIANG GEELY AUTOMOBILE RESEARCH INSTITUTE CO., LTD--.

Signed and Sealed this
Fifth Day of November, 2019

Andrei Iancu
*Director of the United States Patent and Trademark Office*